United States Patent

[11] 3,549,128

| [72] | Inventors | Nicholas S. Homiak<br>Wanaque, N.J. 07465;<br>Robert K. Cole, Butler, N.J. 07405 |
|---|---|---|
| [21] | Appl. No. | 752,580 |
| [22] | Filed | Aug. 14, 1968 |
| [45] | Patented | Dec. 22, 1970 |

[54] TOOL FOR PUSHING OR PULLING A CABLE THROUGH A PIPE OR THE LIKE
11 Claims, 11 Drawing Figs.

[52] U.S. Cl. .................................................. 254/134.3, 81/3
[51] Int. Cl. .................................................. E21c 29/16
[50] Field of Search ........................................... 226/127, 128—133; 254/134.3, 134.5, 134.6, 134.3(FT); 294/16, 118, 26; 81/3(06)

[56] References Cited
UNITED STATES PATENTS

| 1,809,068 | 6/1931 | Roth ............................ | 81/3(.06) |
| 2,736,532 | 2/1956 | Hughes ....................... | 254/134.3(FT) |
| 3,298,666 | 1/1967 | Prange ........................ | 226/127X |

*Primary Examiner*—Allen N. Knowles
*Attorney*—Polachek and Saulsbury

ABSTRACT: A tool for pushing or pulling a cable or wire through a pipe or the like which allows gripping the cable whenever desired and allows release of the cable as desired and may be operated with either short or long strokes as may be most conveniently accomplished. The tool has a guide casing and a pliers-type gripping tool with grippers slidable in said guiding casing. The gripping tool has handle members for pushing or pulling the gripping tool with cable attached.

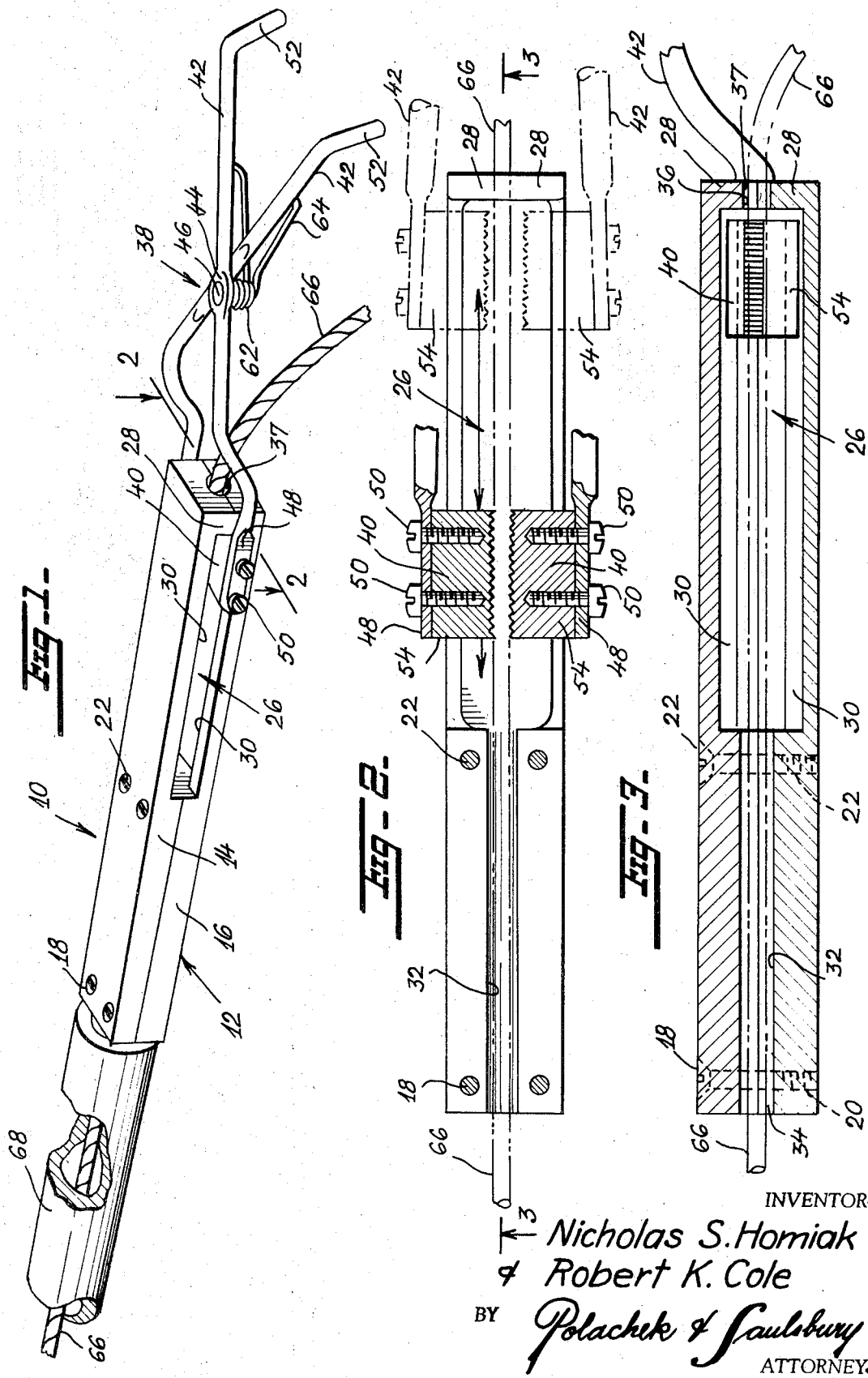

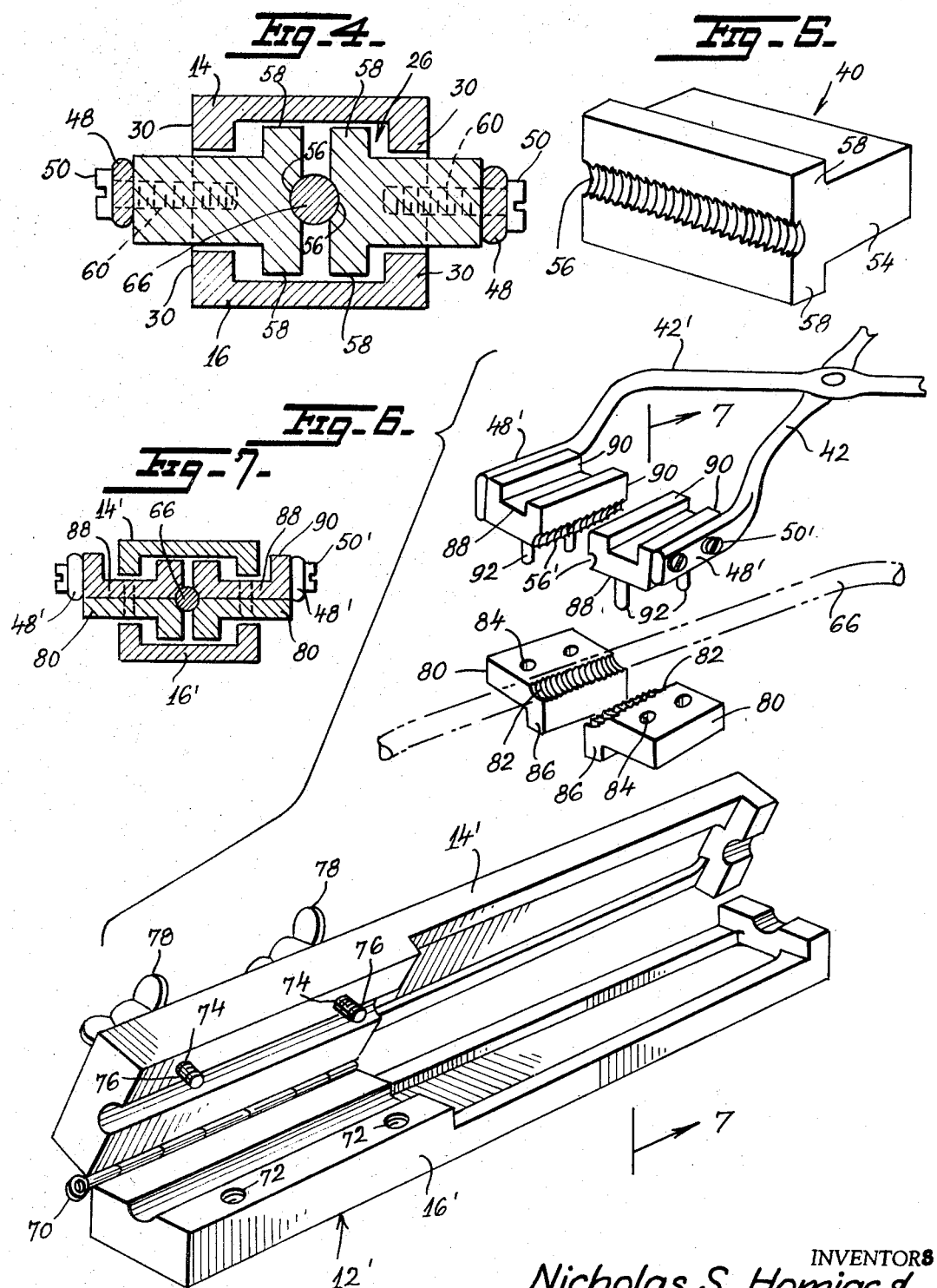

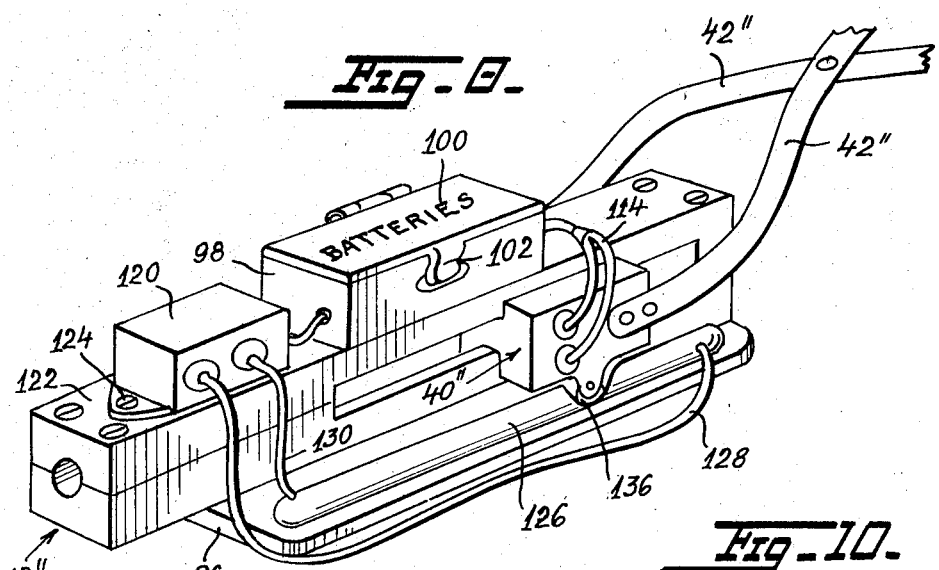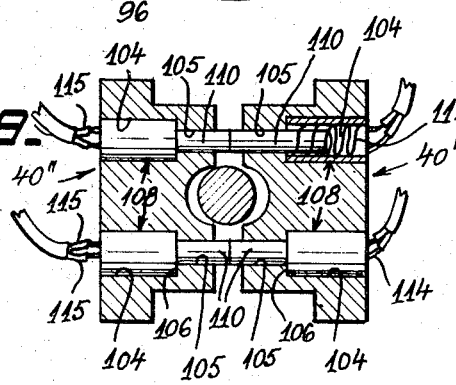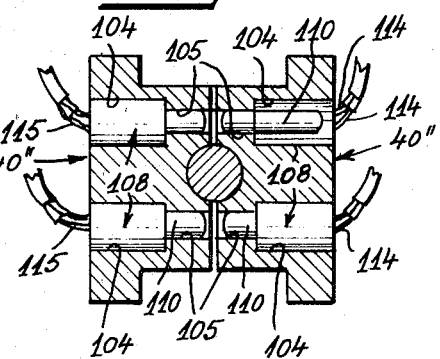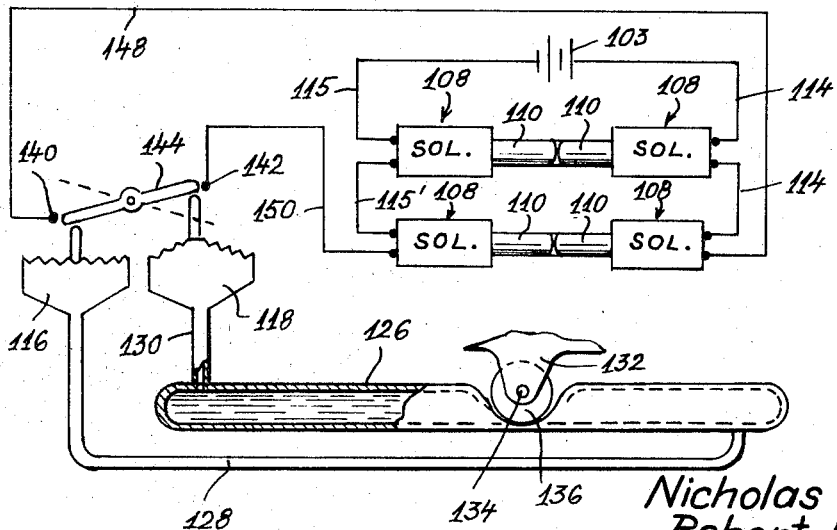

TOOL FOR PUSHING OR PULLING A CABLE THROUGH A PIPE OR THE LIKE

This invention relates to new and useful improvements in a tool for pushing or pulling wires or cables through cable housings on buses, trucks and the like.

An important object of the present invention is to provide a tool which allows gripping of the cable whenever desired, allows release of the cable when desired and may be operated with either short or long strokes as may be most conveniently accomplished.

Another object of the invention is to provide a tool of this kind which may be quickly and easily applied to or removed from the cable.

A specific object of the invention is to provide a tool of this kind for holding and selectively engaging a cable or wire while advancing the cable or wire in either one of two directions.

Still another object is to provide a tool of this kind which is simple, economical to manufacture, and efficient in operation.

Various objects, features and advantages of the invention will become apparent upon reading the following specification together with the accompanying drawing forming a part thereof.

Referring to the drawing:

FIG. 1 is a perspective view of a cable and pulling pushing tool made in accordance with the present invention, a section of cable being shown positioned therethrough, parts being shown broken away.

FIG. 2 is a longitudinal sectional view taken on the plane of the line 2–2 of FIG. 1.

FIG. 3 is a longitudinal sectional vie view taken on the plane of the line 3–3 of FIG. 2.

FIG. 4 is a cross-sectional view taken through the grippers.

FIG. 5 is a perspective view of a gripper.

FIG. 6 is a spread perspective view of a modification, parts being shown in open position.

FIG. 7 is a sectional view taken on the plane of the line 7–7 of FIG. 6 showing the parts in closed position.

FIG. 8 is a front perspective view of another modification of the invention.

FIG. 9 is a cross-sectional view of a pair of grippers shown in open position.

FIG. 10 is a similar view showing the grippers in closed position.

FIG. 11 is a wiring diagram of the solenoids and switches.

Referring now in detail to the various views of the drawing.

In FIG. 1, a cable or wire pushing and pulling tool embodying one form of the invention is shown and designated generally at 10. The tool includes a flat metal sectional guide casing 12 formed of two flat solid sections 14 and 16 detachably secured together by means of screws 18 passing through aligned threaded openings 20 at one end and screws 22 passing through aligned threaded openings 24 intermediate the ends. The sections are cut away from a point adjacent the screws 22 to the other end forming a guide slot 26. The other end of the casing is formed with opposed flanges 28 contacting each other and serving as a stop. The slotted portion of the casing is formed with opposed flanges 30,30 along the sides thereof. Each section 14 and 16 on its inner surface is formed with a central elongated groove 32 which are aligned forming a central passage 34 through the sections to the slotted portion 26. The end flanges 30,30 are formed with opposed aligned grooves 36,36 forming a passage 37.

A gripping tool 38 of the pliers type is associated with the guide casing 12 and comprises a pair of opposed metal block jaws 40,40 slidably mounted in the slot 26. The jaws are carried by wire handle members 42,42 of heavy wire stock. The handle members are flattened midway their ends as indicated at 44, the flattened portions being superimposed and perforated centrally thereof to receive a pivot pin 46. One end of each handle member is flattened as indicated at 48 and is secured to the adjacent jaw 40 by screws 50,50. The other end of each handle member is slightly curved as indicated at 52.

Referring to FIG. 5, each jaw 40 is formed of a flat block of metal 54 of rectangular configuration with a central threaded groove 56 formed in one long surface thereof and with flanges 58,58 formed on both sides of and along said long surface thereof, the inner long surface as viewed in FIG. 4. Threaded holes 60 are formed in the opposed long surface of the block to receive the screws 50,50. A coiled wire spring 62 is supported on the pivot pin 46 and has its ends 64,64 anchored to the handle members 42 so that the handle members 42 are urged apart at their free ends and at the ends carrying the grippers 40,40.

In use, a cable or wire 66 is positioned lengthwise in the guide casing 12 by separating the sections 14 and 16 so that it extends beyond both ends thereof. While the sections are separated, the jaws 40,40 of the gripping tool are placed on opposed sides of the cable inside the guide casing. One end of the cable is threaded through one end of a pipe or tube 68 to be supported with a cable, the other end extending to the supply reel or the like. The sections are replaced and the guide casing 12 is gripped by one hand and the free ends of the handle members 42,42 gripe gripped by the other hand and squeezed toward each other whereby the grippers 40,40 grip the cable. A forward push by the operator is urged against the handle members 42,42 whereby the grippers force the cable forward the length of the slot 26. Pressure on the handle members 42,42 is then released and the coiled wire 62 thereupon urges the ends of the handle members away from each other thereby releasing the grippers 40,40 from the cable, permitting the grippers to be manually retracted to the end of the slot for a repeat performance.

Referring now to the modification of the invention shown in FIGS. 6 and 7, wherein the guide casing 12' is sectioned but the sections 14' and 16' are hinged to each other by means of the hinge construction 70 at one end thereof. The section 16' is formed with spaced threaded holes 72 on its upper surface as viewed in FIG. 6 along one side thereof, and the section 14' is formed with similar threaded holes 74 adapted to align with the holes 72, the aligned holes adapted to receive screws 76 with wing nuts 78 for holding the sections in closed position.

In this form, the grippers are sectioned and are constituted by flat platelike gripping members 80,80 one long corner of each member being cutaway and formed with screw threads 82, the cutaway portion being arcuate shaped. One flat surface is formed with a pair of spaced holes 84,84 and one long edge is formed with a depending flange 86, the edge adjacent the cutaway portion.

A pair of flat gripper members 88,88 is carried by the flattened portions 48' of the handle members 42', each gripper member 88 having a pair of flanges 90,90 formed on the top surface along the long edges thereof and depending from the other flat surface is a pair of spaced pins 92,92 adapted to seat in the holes 84,84 in the gripper members 80,80. Each gripper member 88 is formed with an arcuate shaped cutaway portion with threads 56' along one long edge of the bottom corner thereof, the inner long edge as viewed in FIG. 6. The cutaway portions coact with the cutaway portions in gripper plate members 80,80 to form a circular passageway through the gripper members. The gripper members 88,88 are secured to the handle members 42',42' by means of the screws 50',50'.

In use, the sections 14' and 16' swing open for positioning the cable whereupon they are swung to closed position over the cable and the screws 76 tightened. The cable extends through the gripper members and the gripping tool functions similarly to the gripping tool of FIG. 1 for pushing the cable through the pipe or tube.

It will be understood that the gripper tool may pull the cable or wire in the opposite direction if desired.

Referring now to the modification of the invention shown in FIGS. 8—11, inclusive, herein battery operated mechanism is disclosed for releasing and closing the grippers from and onto the cable. The casing 12" is shown mounted on a rectangular plate 96 and mounted on the casing 12 midway its ends is a battery box 98 having a hinged cover 100 with handle 102. The battery is indicated diagrammatically at 103 in FIG. 11.

Each jaw 40" is formed with a pair of upper and lower passages 104,104 extending across the body intersecting the long surfaces thereof with reduced portions 105 intersecting one long surface thereof, providing interior shoulders 106,106.

Solenoid devices 108,108 are mounted in the passages 104,104, each device consisting of a tubular body and reduced magnet 110 spring pressed outwardly of the jaw by means of a coiled spring 112. The solenoids of one gripper jaw, the right hand gripper jaws as seen in FIG. 9, are connected to one side of the battery 103 by conductors 114 and the solenoids of the other gripper jaw by conductors 115 as seen in FIG. 11.

A pair of bellows 116 and 118 is mounted in a housing 120 secured in position on the casing 12" by means of a perforated ear 122 and screw 124. Each of bellows 116 and 118 is connected to an elongated cylindrical rubber sac 126 supported on the plate 96 and connected at one end by a hose 128 to the bellows 116, and at its other end by a hose 130 to the bellows 118.

One of the jaws 40" is formed with a depending perforated ear 132 forming a bearing for the shaft 134 of a wheel 136 that is adapted to ride along the top of the sac 126 thereby squeezing the sac and forcing the fluid 138 therein through either hose 128 or 130 so as to activate the bellows 116 and 118.

Inside the housing 120, there is an electric switch including a terminal contact 140 controlling the activation of the solenoids in one gripper jaw, and a terminal contact 142 controlling activation of the solenoids 108 in the other gripper jaw. A lever 144 is pivotally mounted in the housing 120 with its free ends adapted to close the circuit through either of said contact 140 or 142. Contact 140 is connected by means of a conductor 148 to one side of the battery through one of the solenoids; and contact 142 is similarly connected to the other side of the battery by conductor 150.

In operation, assuming that the electric circuit is in closed position as shown in FIG. 11, the handle members 42",42" are grasped by the hand of the operator and squeezed gripping the a cable as shown in FIG. 10. The gripper jaws are pushed forwardly carrying the wheel 136 over the sac 126 thereby forcing the fluid through hose 130 to bellows 118 which tilts the lever 144 away from the terminal contact 142 thereby breaking the circuit through the solenoids whereby the reduced portions 110 of the solenoids are moved away from each other by the coil springs 112 to the position shown in FIG. 10.

When the gripper jaws 40" are pulled the other way, the wheel 136 forces the fluid through the nose 128 which tilts the lever 144 upwardly bringing its free ends into contact with contacts 140 and 142 closing the circuit.

While I have shown and described what I believe to be the best embodiment of my invention, it will be apparent to those skilled in the art that various changes and modifications may be made therein without departing from the spirit and scope of the invention as defined in the appended claims.

We claim:

1. A tool for pushing or pulling a cable through a pipe or the like, comprising an elongated flat guide casing having an elongated slot therein and therethrough; a gripping tool of the pliers-type having crossed handle members pivotally connected midway their ends; cable grippers carried at one end of the handle members disposed inside the slot and adapted to grip a cable disposed lengthwise in the guide casing, said handle members and grippers with cable adapted to be manually moved along the guide casing, pushing the cable outwardly of one end thereof into a pipe or the like to be cabled.

2. A tool for pushing or pulling a cable through a pipe or the like as defined in claim 1, wherein the cable grippers are each constituted by a rectangular metal block with a central threaded groove along one narrow side thereof and with guide flanges on both sides of said narrow grooved side, said threaded grooves being opposed and adapted to engage the cable for pushing it through the guide casing and into the pipe.

3. A tool for pushing or pulling a cable through a pipe or the like as defined in claim 1, characterized by a coiled spring engaging the handle members for urging the ends of the handle members away from each other whereby the grippers are automatically released from the cable for retraction of the grippers for repeat performances.

4. A tool for pushing or pulling a cable through a pipe or the like as defined in claim 1, characterized by flanges on the sections of the guide casing and on the grippers adapted to coact for guiding the grippers through the slot in the guide casing.

5. A tool for pushing or pulling a cable through a pipe or the like as defined in claim 2, characterized by a coiled spring engaging the handle members for urging the ends of the handle away from each other whereby the grippers are automatically released from the cable for retraction of the grippers for repeat performances.

6. A tool for pushing or pulling a cable through a pipe or the like as defined in claim 3, characterized by flanges on the sections of the guide casing and on the grippers adapted to coact for guiding the grippers through the slot in the guide casing.

7. A tool for pushing or pulling a cable through a pipe or the like as defined in claim 1, wherein the guide casing is sectional and is formed with central passages through the ends thereof communicating with the slot for receiving the cable to be moved.

8. A tool for pushing or pulling a cable through a pipe or the like as defined in claim 1, wherein the guide casing is sectional with one section hinged to the other and means for releasably holding the sections in closed position including aligned holes in the sections and screws with nuts extending through the aligned holes.

9. A tool for pushing or pulling a cable through a pipe or the like as defined in claim 8, wherein the grippers are sectional, each gripper consisting of a pair of separable platelike members, one of said platelike members having a pair of spaced holes, the other of said platelike members having a pair of pins adapted to seat in said holes, said platelike members having threaded cutaway portions forming circular passages for engaging a cable to be moved through the pipe.

10. A tool for pushing or pulling a cable through a pipe or the like as defined in claim 1, wherein a battery is mounted on the guide casing; solenoids carried by the gripper jaws operatively connected to the battery for activating the solenoids; and means associated with the gripper jaws for controlling the circuit through the solenoids.

11. A tool for pushing or pulling a cable through a pipe or the like as defined in claim 10, wherein the guide casing is mounted on a rectangular shaped plate, and wherein the means for controlling the circuit through the solenoids includes an elongated sac supported on the plate and with a fluid; a hose cone connected to one end of the sac and leading to a bellows; another hose cone connected to the other end of the sac and leading to a bellows; a wheel carried by one of the grippers for squeezing said sac; an electric switch mounted on the guide casing, said switch including a pair of spaced electrical contacts; a pivoted lever spanning the space between the contact; one of said bellows adapted to tilt said lever for breaking the circuit through the solenoids, the other of said bellows adapted to tilt the lever for closing the circuit through the solenoids.